Nov. 24, 1942.  A. BAROL  2,302,934
MODEL BLOOD CELL
Filed Oct. 6, 1941
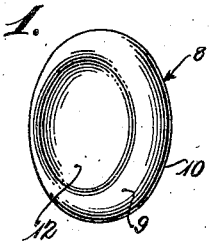
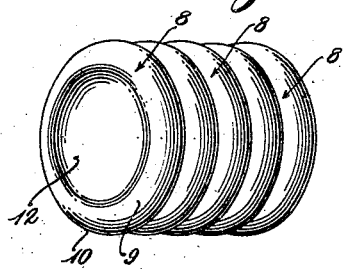
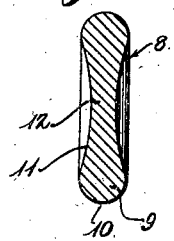
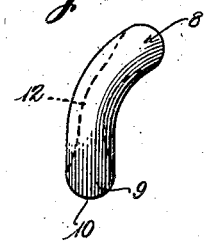
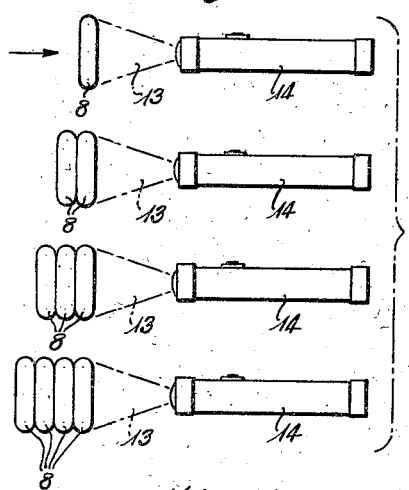
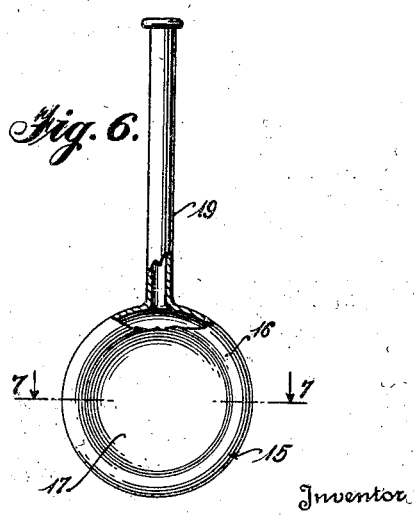
Inventor
Alfred Barol
By
Attorney Patented Nov. 24, 1942

2,302,934

UNITED STATES PATENT OFFICE 2,302,934

MODEL BLOOD CELL

Alfred Barol, Philadelphia, Pa., assignor to John Wyeth & Brother, Incorporated, Philadelphia, Pa., a corporation of Delaware Application October 6, 1941, Serial No. 413,876

5 Claims. (Cl. 35—17)

This invention relates to a model red blood cell or erythrocyte and has for its primary object the provision of a model in magnified form which will embody the essential characteristics of the natural erythrocyte for lecture, demonstration and explanatory purposes.

In normal blood the mature erythrocyte of man is a biconcave disk of characteristic size, shape and hemoglobin content, and is elastic. This disk varies from 7 to 8 micra in diameter and from 2 to 3 micra in thickness. The individual cell is pale yellow in color with little or no color in the central portion. It is considered to be of bag form with a definite covering membrane enclosing an interior consisting of a firm stroma the meshes of which contain hemoglobin.

Viewed singly, under a microscope, an erythrocyte has a pale yellow color, but when a mass of such cells, as in a drop of blood, is similarly seen, the red color is visible. This is due to a phenomenon which takes place in normal blood in that the individual cells tend to adhere to each other at adjacent sides to form "rouleaux" of some length.

It is the purpose of this invention, therefore, to provide a model cell which will illustrate the shape, flexibility, color and characteristic rouleau formation of the normal red cell by means of appropriate construction.

Referring to the drawing accompanying this specification:

Figure 1 is a perspective view of the model cell.

Fig. 2 is a perspective view showing the formation of a rouleau.

Fig. 3 is a section.

Fig. 4 shows the distortion due to flexibility.

Fig. 5 illustrates the color changes due to rouleau formation.

Fig. 6 shows a modified form of the device; and

Fig. 7 is a section on line 7—7 of Fig. 6.

The cell model is indicated as a whole by the numeral 8 and comprises an annular outer portion 9 relatively thicker and having a continuous semi-circular periphery 10. In the form shown in Figs. 1-5 the cell is of solid flexible material. Extending inwardly as at 11 from the portion 9 the material is molded to form oppositely concave faces, defined by a narrow central portion 12 thus illustrating the normal biconcave form of the normal cell.

To show the flexibility of the normal cell the model need only be distorted as shown in Fig. 4 or similarly.

In order to simulate the color phenomenon and rouleau characteristics I have discovered a particular rubber composition which will give the desired results.

It is of the pure gum type containing only the minimum amount of the necessary ingredients to obtain sufficient vulcanization.

The loading based on 100 parts of pale crepe rubber is as follows:

| | Per cent |
|---|---|
| Sulfur | 1.5 |
| Zinc oxide | .5 |
| "Neozone A" | .9 |
| "Acrin" | .15 |
| "Thionex" | .15 |

"Acrin," used as the primary accelerator, is a condensation product of hexamethylene-tetramine, benzyl chloride and mercaptobenzothiazole, has a specific gravity of 1.25, is non-toxic and non-staining, and has a faint almond odor.

"Thionex," used as a secondary accelerator, has a specific gravity of 1.39, is non-toxic and non-staining, and has no odor. Its chemical composition is tetramethylthiurammonosulfide.

"Neozone A," used as an antioxidant, has a specific gravity of 1.17 and is non-toxic and its chemical composition is phenylalphanaphthylamine.

Individual cells, Figs. 1 and 3, are lightly vulcanized in properly shaped molds. The finished article, due to a slight inherent adhesiveness and slight vacuum action will adhere one to the other when assembled to form the rouleau.

As previously stated, a single blood cell exhibts only the characteristic color of the hemoglobin, which normally is a pale yellow. It is only when a plurality of single cells form a rouleau that the red of the blood stream is shown. In Fig. 5 this phenomenon is illustrated by the use of my model cells in conjunction with a beam of light from an ordinary electric flashlight 14. This Fig. 5 illustrates diagrammatically in four stages, reading from top to bottom, the action of light as seen through, first, one of my model cells when viewed from the direction of the arrow at the top of Fig. 5. The model blood cell exhibits only the characteristic yellow or straw color of the hemoglobin. In the second showing two of the model cells have been united to show the beginning of a rouleau and when viewed now exhibit a darker yellow color tinged with pink. In the next showing three cells have been similarly united and the beam of light gives a very definite pink coloration. In the bottom view of Fig. 5 four cells have been placed together to indicate a rouleau and the light seen there through is definitely red and illustrates the red coloration of a normal blood stream. This illustration is made possible by the particular rubber compound set forth above, and it may be readily seen that a demonstration in accordance with the four showings in Fig. 5 may be used in detail work or lectures to demonstrate the lack of red blood color in a single cell which is changed to the normal red blood color by the formation of the rouleau.

In Figs. 6 and 7 I have shown a modification of the model blood cell which illustrates the conception of the structure of a single blood cell as conceived by certain students at the present time. This conception may be considered to be that the red blood cell is a balloon-like structure containing an elastic stroma and the functioning substance which is a fluid colloid covered by a condensation of the lipoid and protein stroma which gives the effect of a delicate outer membrane forming the cover. To illustrate this I have prepared an elastic bag indicated by the numeral 15 and formed of an appropriate rubber composition. This bag is circular in outline and in cross section is the same biconcave disc as shown in the construction illustrated in Figs. 1 to 4 inclusive, but in the modification is formed by an outer wall 16, thickened at its central portions, 17 and 18, to confine a hollow portion from which extends an open ended tube 19. The purpose of this tube 19 is to permit filling of the open member with liquid of any desired color but usually of the yellow or straw color characteristic of the hemoglobin, or to inflate the open member. In the modification the structure is such that the adhesion characteristics of rouleau formation may be again exhibited, the shape of the disk portion being such as to permit a slight vacuum holding one to the other while the color characteristics inherent in my particular rubber composition will again give the change of color from yellow to pink to red as exhibited in the various steps shown in Fig. 5, but in the modification being capable of even more careful control and illustration, due to the filling of the hollow disk member by liquid through the tube 19. Obviously, after the hollow portion has been filled the tube 19 may be stoppered or otherwise closed to prevent spilling of the contents.

It will thus be seen that I have provided a model red blod cell or erythrocyte which, in highly magnified form, will, due to my discovery of the forming composition, be capable of illustrating the complete characteristics and action of a single red blood cell in the circulatory system as well as the action of such cells after they have formed a rouleau. Such a model cell is highly valuable and useful in illustrating, in highly magnified form, such characteristics.

Of course it is not intended to confine the embodiment of my idea to the forms and materials described above which are merely intended as possible forms and materials. Other appropriate materials may be used.

Having thus described my invention, what I claim is:

1. A model red blood cell of enlarged size of elastic moldable material having one or more of the characteristics of an erythrocyte such as color, shape, flexibility and rouleau formation.

2. A model red blood cell of enlarged size of rubber composition having one or more of the characteristics of an erythrocyte such as color, shape, flexibility and rouleau formation.

3. A model red blood cell of enlarged size formed of a composition capable of illustrating the color change characteristics of a normal erythrocyte by the use of a single model and a plurality of said models.

4. A rouleau of model red blood cells of enlarged size, each of said models being formed from material capable of demonstrating the characteristics of a normal erythrocyte rouleau such as shape, color and rouleau formation.

5. A model red blood cell of enlarged size comprising a hollow elastic body having one or more of the color, shape and rouleau formation characteristics of an erythrocyte and a filling tube extending from said body and communicating with the hollow interior whereby the model cell may be filled with material to demonstrate morphological and color variations.

ALFRED BAROL.